(12) United States Patent
Lashina et al.

(10) Patent No.: US 8,599,133 B2
(45) Date of Patent: Dec. 3, 2013

(54) PRIVATE SCREENS SELF DISTRIBUTING ALONG THE SHOP WINDOW

(75) Inventors: Tatiana Aleksandrovna Lashina, Eindhoven (NL); Sander Bernard Francis Van De Wijdeven, Eindhoven (NL); Evert Jan Van Loenen, Waalre (NL); Vincentius Paulus Buil, Eindhoven (NL); Gerrit Hollemans, Eindhoven (NL); Kero Van Gelder, Eindhoven (NL); Markus Gerardus Leonardus Maria Van Doorn, 'S-Hertogenbosch (NL)

(73) Assignee: Koninklijke Philips N.V., Eindhoven (NL)

( * ) Notice: Subject to any disclaimer, the term of this patent is extended or adjusted under 35 U.S.C. 154(b) by 652 days.

(21) Appl. No.: 12/373,842

(22) PCT Filed: Jul. 10, 2007

(86) PCT No.: PCT/IB2007/052736
§ 371 (c)(1),
(2), (4) Date: Jan. 14, 2009

(87) PCT Pub. No.: WO2008/012716
PCT Pub. Date: Jan. 31, 2008

(65) Prior Publication Data
US 2009/0322678 A1  Dec. 31, 2009

(30) Foreign Application Priority Data

Jul. 28, 2006 (EP) .................................... 06118081

(51) Int. Cl.
*G09G 5/08* (2006.01)
(52) U.S. Cl.
USPC ........................................................ 345/158

(58) Field of Classification Search
USPC ........................................................ 345/158
See application file for complete search history.

(56) References Cited

U.S. PATENT DOCUMENTS 5,123,192 A * 6/1992 Hsieh .............................. 40/442
5,917,472 A * 6/1999 Perala ........................... 345/157
(Continued)

FOREIGN PATENT DOCUMENTS

DE      29814620 U1     1/1999
DE      10237315 A1     2/2004
(Continued)

OTHER PUBLICATIONS

C.S. Pinhanez et al; "Ubiquitous Interactive Graphics", IBM Research Report RC22495, (WO205143), May 17, 2002.

*Primary Examiner* — William Boddie
*Assistant Examiner* — Towfiq Elahi
(74) *Attorney, Agent, or Firm* — John F. Salazar; Mark Beloborodov

(57) ABSTRACT

An interactive method and system include at least one detector (210) configured to detect the position of at least one user (240) in proximity of a panel (205), such as a transparent panel of a shop window (205). A processor (120) is provided which may be configured to activate a portion of the panel to display information. This portion, referred to as a private screen (230), may be substantially near the user's position. The processor (120) may be further be configured to move the private screen (230) so that it follows movement of the user (120). When a second user (245) is detected, then a second private screen (235) is activated substantially near the second user (245). The location of the second private screen (235) relative the location of the first screen (230) is such that interference is reduced between the two users or screens.

11 Claims, 6 Drawing Sheets

(56) References Cited

U.S. PATENT DOCUMENTS

| | | | |
|---|---|---|---|
| 6,414,672 B2 * | 7/2002 | Rekimoto et al. | 345/173 |
| 6,536,658 B1 * | 3/2003 | Rantze | 235/375 |
| 7,782,274 B2 * | 8/2010 | Manning | 345/1.3 |
| 2002/0098001 A1 * | 7/2002 | Dahl | 396/429 |
| 2002/0158827 A1 * | 10/2002 | Zimmerman | 345/88 |
| 2003/0057887 A1 | 3/2003 | Dowling et al. | |
| 2003/0117425 A1 * | 6/2003 | O'Leary et al. | 345/700 |
| 2003/0190940 A1 * | 10/2003 | Gordon et al. | 463/9 |
| 2004/0196433 A1 | 10/2004 | Durnell | |
| 2006/0080621 A1 | 4/2006 | Park | |
| 2008/0238889 A1 * | 10/2008 | Thorne | 345/204 |

FOREIGN PATENT DOCUMENTS

| | | |
|---|---|---|
| EP | 1158820 A1 | 11/2001 |
| EP | 1282271 A1 | 2/2003 |
| EP | 1534023 A1 | 5/2005 |
| GB | 2367991 A | 4/2002 |
| WO | 2006056776 A | 6/2006 |
| WO | 2007015200 A2 | 2/2007 |
| WO | 2008012717 A2 | 1/2008 |

* cited by examiner

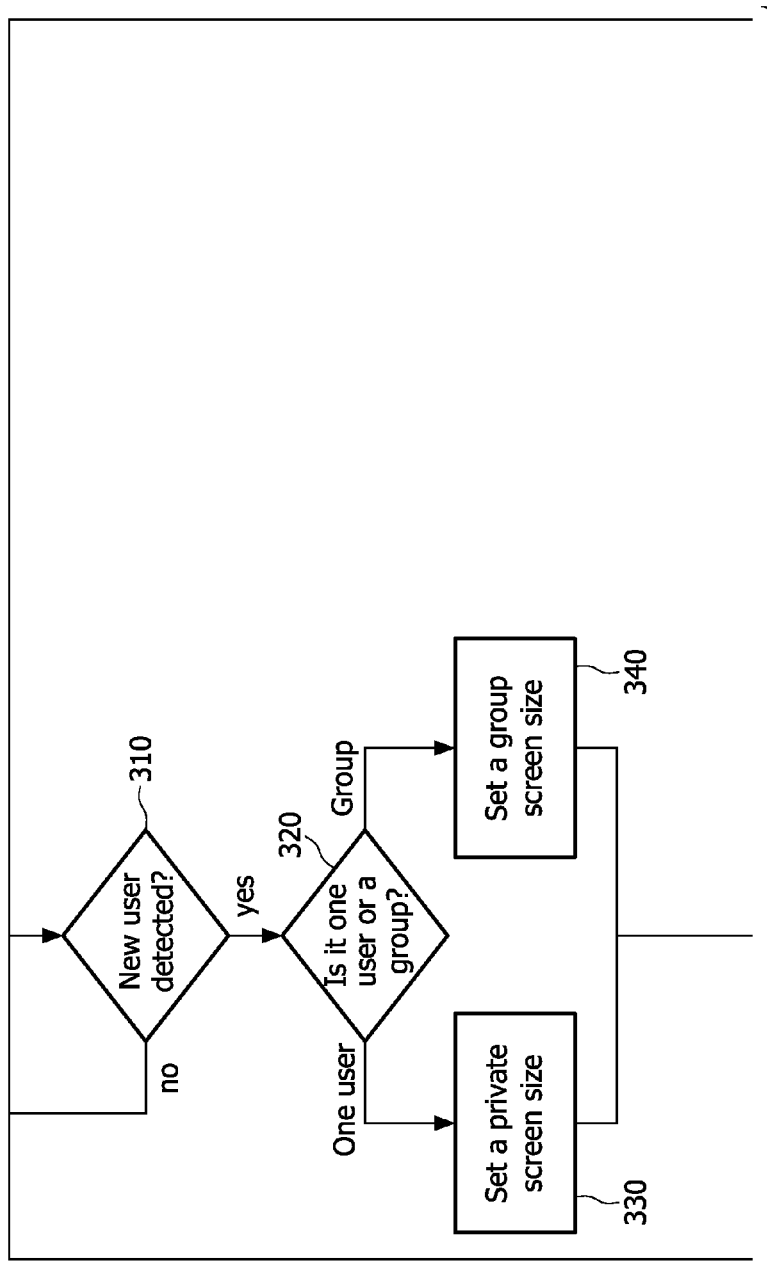

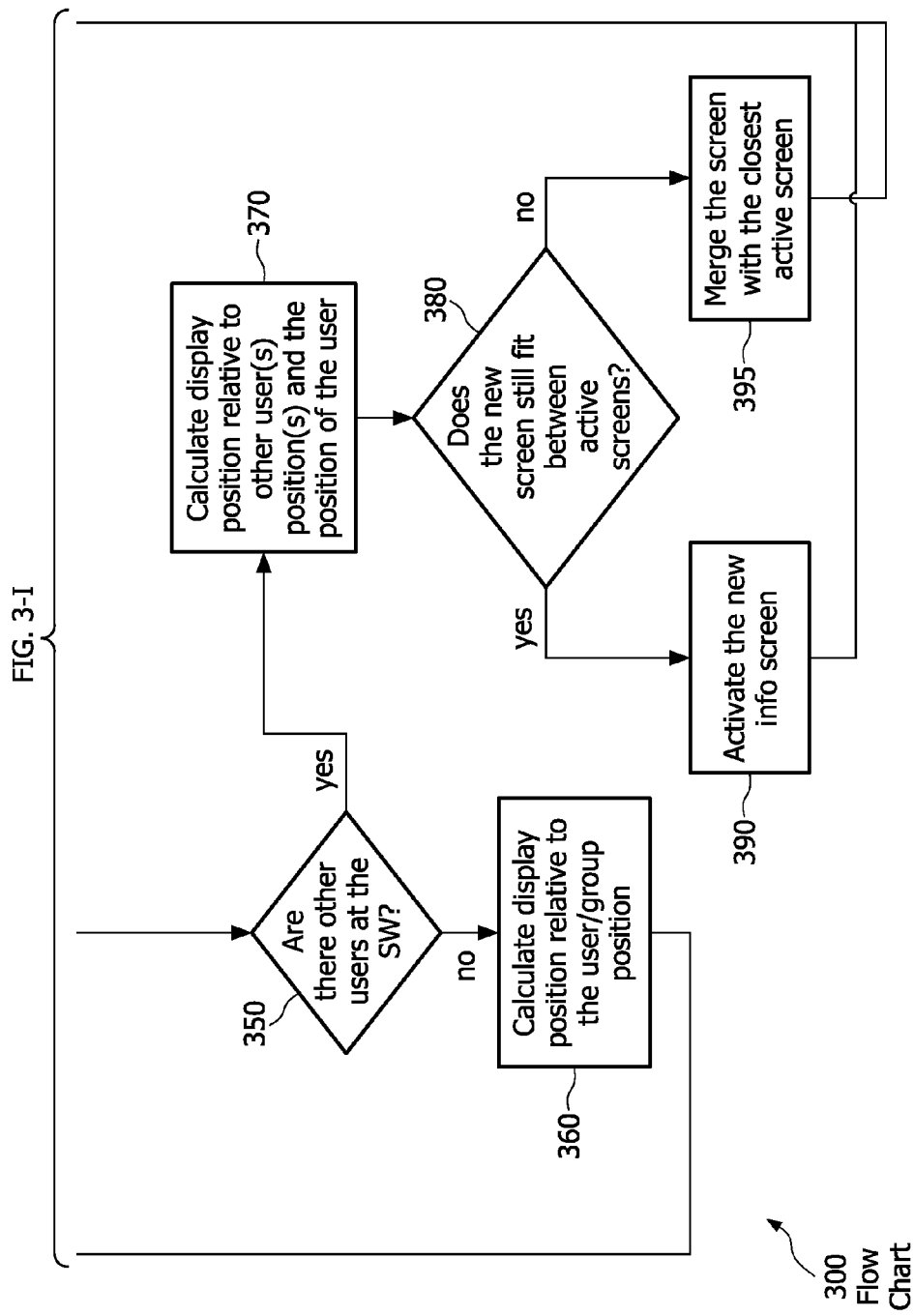

PRIVATE SCREENS SELF DISTRIBUTING ALONG THE SHOP WINDOW

This application is a national stage application under 35 U.S.C. §371 of International Application No. PCT/I132007/052736 filed on Jul. 10, 2007, and published in the English language on Jan. 31, 2008, as International Publication No. WO/2008/012716, which claims priority to European Application No. 06118081.6, filed on Jul. 28, 2006, incorporated herein by reference.

The present invention relates to an interaction solution for positioning private screens along a panel, such as a transparent shop window for example, in response to detecting position of users or viewers looking at the shop window.

For entertaining customers and for the sake of providing extra information about products, retailers already deploy various display technologies ranging from large liquid crystal display (LCD) or plasma displays to transparent projection screens. These displays are often found installed in shop windows where they are used to display video clips, a slide show with announcements or information about the shop or their products. Most of the currently used shop window displays are pure informative non-interactive screens. More advanced shop window displays offer some interactivity with the display device on a basic level, where a user can press a button on or near the display device to activate some functionality, such as go to the next or previous page.

A more attractive shop window may be realized by combining physical products exhibited behind the shop window and a shop window display that would show information about the product(s) the user is interested in. Such a shop window display system may infer the interest of the user either using gaze tracking or pointing gestures and/or touch detection such as via capacitive touch detectors, as described in European Patent Application Serial Number 05107205.6, filed Aug. 4, 2005, entitled "Apparatus for Monitoring a Person Having an Interest to an Object, and Method Thereof" which is incorporated herein by reference in its entirety. In such an interactive shop window, the user may look or point at a physical product. The looking/gazing and/or pointing is detected by the shop window, in response to which the shop window displays information about the product on the display. Such a shop window is advantageous since it enables the viewer(s) to both actually see the real physical product and at the same time get additional (e.g., digital) information, including various interactive services provided/suggested on the display device.

Certain situations are not well addressed in an environment where various items are displayed, such as behind a transparent panel or glass or plastic for example, such as in a shop window. For example, one of the questions that arises in such an environment like the shop window set-up, where physical products are provided behind the shop window and a display is provided, such as a transparent embedded into the shop window glass, is where to position the display relative to the products behind the glass relative to the position of the user or viewer. Even if the most comfortable size and position for the display are empirically defined for general viewers, there are many be individual preferences of individual and even general viewers. Accordingly, there is a need to adjust display parameters and content, such as the size and/or position of the screen or display automatically, such as in response to implicit user action, or under the control of the user such as in response to explicit user action.

Another problem arises when multiple customers approach the shop window simultaneously. If it is not a group of people shopping together, then ideally everyone would prefer to have his or hers own private screen. By contrast to multiple individual users, a group of people shopping together would prefer a larger screen. The question arises as to how a shop window can satisfy various diverse interests of individual or multiple users, as well as the need of a group of users, by providing comfort and flexibility to the users for interacting and using the shop window system, for example.

One object of the present systems and methods is to overcome the disadvantage of conventional interactive systems.

This and other objects are achieved by systems and methods where, for example, an interactive shop window is provided which is capable of detecting the positions of users in their proximity to the display/shop window and to each other, and where multiple private displays, one for each user, are activated and distributed over the entire space or panel of the shop window. The private displays may be automatically distributed dependent on the positions of the corresponding user(s), whether the user(s) stands as a group or as individual(s). Such a shop window may also offer various interaction techniques, such as allowing users to manually adjust their associated private screen parameters and content, such as position and/or size, as well as to merge private screens together to form group screens and split a group screen into two or more private screens. The merging and splitting of screens may also be performed automatically upon detection of a group formation and dissolution/separation of the group, respectively. In addition to responding the implicit user input, the merging and splitting of screens, as well as other interaction, may also be performed in response to explicit user input.

According to one illustrative embodiment, an interactive method and system comprises a detector such as a camera, for example, configured to detect the position of at least one user in proximity of a panel, such as a transparent panel of a shop window capable of displaying information on one or more screens. A processor is provided which may be configured to activate a portion of the panel to display information. This portion, also referred to as a private screen, may be substantially near the user's position. The processor may further be configured to move the private screen so that it follows movement of the user.

When a second user is detected, then a second portion of the shop window or another private screen is activated substantially near the second user. The location of the second private screen relative the location of the first screen is such that interference is reduced between the two users or screens. For example, if two private screens are closer to each other than a predetermined distance, then one of the users, such as the second user is invited to stay or move away from the first user such as by moving the second private screen to a location further away from the first private screen. Illustratively, an arrow may be displayed pointing to the new location. Illustratively, when the second user moves to the new location, then the second private screen, if not already displayed or projected at the new location, then will also be moved to its new location which is further away from the first private screen.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

These and other features, aspects, and advantages of the apparatus, systems and methods of the present invention will become better understood from the following description, appended claims, and accompanying drawing where:

FIG. 3 shows a decision process for activating a new information screen on the shop window according to yet another illustrative embodiment of the present invention.

The following description of certain exemplary embodiment(s) is merely exemplary in nature and is in no way intended to limit the invention, its application, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Figure 1:
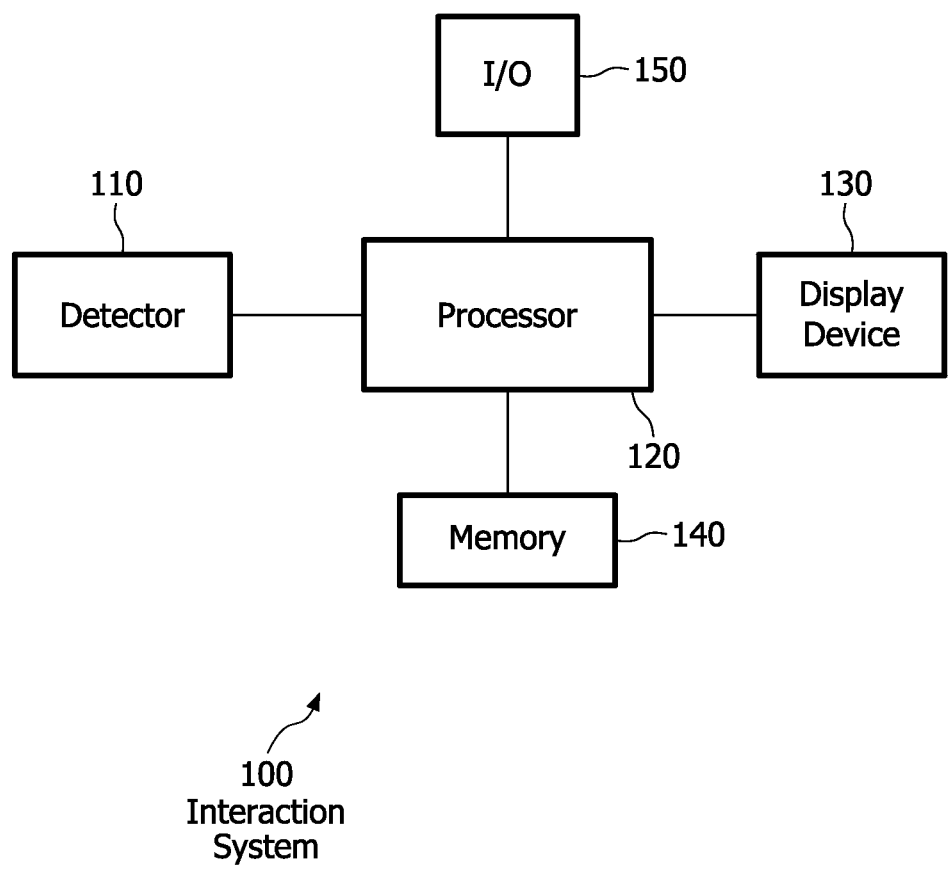
FIG. 1 shows a block diagram of an interactive system according to one illustrative embodiment of the present invention.
Figure 2A:
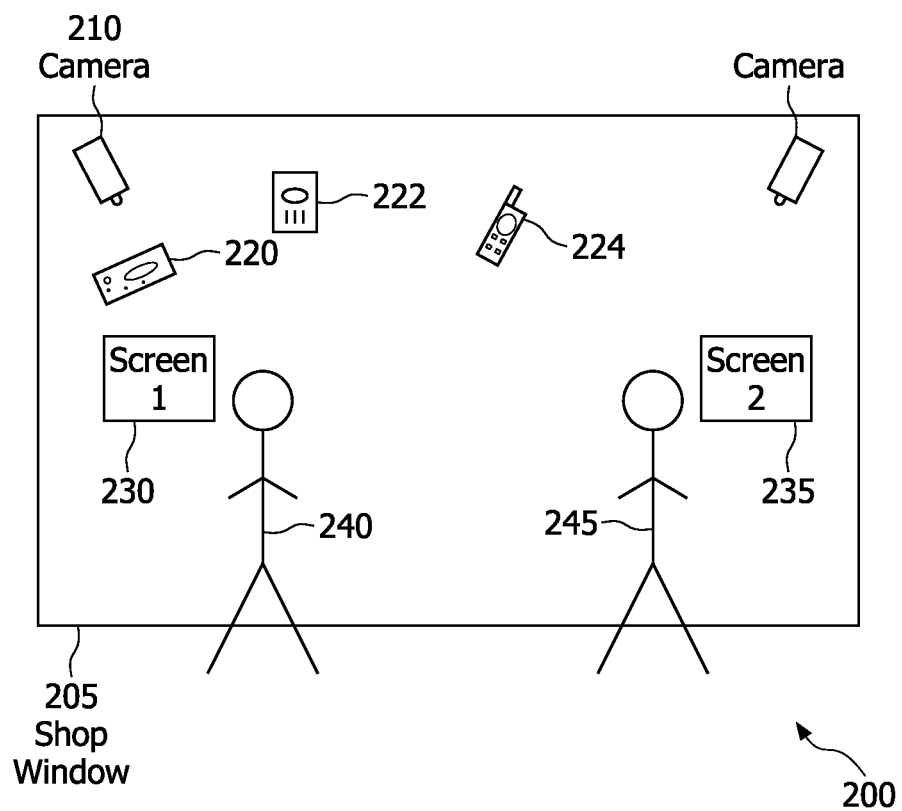
FIGS. 2A-2C show a shop interactive system with various distributions of information displays according to another illustrative embodiment of the present invention.

FIG. 1 shows an interaction system 100 which may be used in an environment where one or more users look at objects, products or items, which may be behind a transparent panel, such as a shop window 205, shown in FIG. 2A, showcasing various products 220, 222, 224, where private screens 230, 235 may be provided for each user to display information, such as information related to the products 220, 222, 224 or any other promotional or educational material and the like. The private screens 230, 235 may be displayed on a display device(s) 130 (FIG. 1) near the products or the panel or shop window 205. Illustratively, the display device 130 is embedded in the shop window 205 where private and/or group screen(s) may be provided on the entire or any portion(s) of the shop window 205.

As shown in FIG. 1, the interaction system 100 includes a detector 110, such as at least one camera (where two cameras 210, 212 are shown in FIG. 2A), configured to detect the position of user(s) 240, 245 near the shop window 205 (FIG. 2A). The detector 110 is operationally coupled to a processor 120 configured to perform desired operational acts, such as upon execution of instructions based on a program stored in the memory 130, for example, which also stores other data for system operation, such as an operating system and the like. For example, the processor 120 may be configured to display information on the display device 130. In the embodiment where display device 130 is embedded in the shop window 205, the processor 120 may be configured to activate a portion of the shop window 205 to provide a screen where any desired information are displayed upon or in response to detection of a user near the shop window 205 by the detector 110, and/or in response to explicit user action.

FIG. 2A shows a shop interaction system 200 where, illustratively, two private screens 230, 235 are formed on portions of the shop window 205 for displaying information, such as projecting the information on the window portions. The private screens 230, 235 are substantially near the corresponding detected user 240, 245. The processor 120 may be further configured to move a private screen 230 to follow the movement of the associated user 240. In addition, the processor 120 may be configured to provide the private screens 230, 235 at locations furthest from each other while maintaining proximity of each private screen to its associated user. That is, the location of one screen relative to the location of another screen is such that interference is reduced between the two users or screens.

For example, in the case where the first user 240 is to the left of the second user 245, as shown in FIG. 2A, then a desirable location for the two private screens 230, 235 is locating the first private screen 230 to the left of the first user 240, while locating the second private screen 235 to the right of the second user 245. Such an arrangement for the two private screens 230, 235, shown in FIG. 2A, maximizes the separation or distance between the two private screens 230, 235, as compared to displaying one or both screens 230, 235 on the opposite side of the associated user 240, 245 (in which case the two screens 230, 235 may be undesirably close to each other, such as when the first screen 230 is to the right of the first user 240 and/or the other screen 235 is to the left of the second user 245).

The private screen image(s) can be generated on the shop window 205 using different approaches. One approach is projecting the image such as using a rear projection or front projection. In the case of rear projection, a projector may be mounted either on the ceiling or on the floor behind the shop window 205, for example, to project light and images on an optical transparent screen attached to the glass of the shop window. The shop window display may be embedded in the transparent shop window 205, for example, or may be a separate display inside the shop window 205 or on it, either on the exterior or interior surface of the shop window 205. For example, rear or front projection displays that project onto a transparent screen, such as the transparent shop window 205, are available from DNP of Denmark, the worldwide screen production centre of Dai Nippon Print Co. Ltd, such as what is referred to as Holo Screen™. Of course, any type of display device may be used capable of displaying information, such as cathode ray tube (CRT), plasma, liquid crystal display (LCD) or projection displays, for example.

In order to generate graphics along the whole space of the shop window with a rear projection, an array of projectors or beamers may be used. Alternatively or in addition to, one projector may be used having a steerable mirror and an algorithmic correction for oblique distortions, as described in an article by Pinhanez C. S., et al., entitled "Ubiquitous Interactive Graphics", IBM Research Report RC22495 (WO205-143), May 17, 2002. Another approach to realize such shop window, which is currently too expensive but is expected to become more affordable, include a transparent organic light emitting display (OLED) integrated into the glass of the shop window, covering a portion or the entire surface of the shop window glass. Any display means may be used capable of displaying information on the entire and/or portions of a panel such as the shop window, for example.

The decision process for activating a new info screen if new user(s) arrive is illustrated in FIG. 3 in the flow chart 300. In block 310, if one user approaches the shop window, the camera mounted behind the glass, for example, detects the position of the user's face and activates a private screen at the eye height shifted to the side from the user, for example. This is the most comfortable position for the screen since it is not in the way of looking at products behind the shop window and it is still close enough to allow the user 240 to shift his visual focus between the products and information display or private screen 230. Of course, the private screen may be displayed and/or moved to any desired location, either automatically or manually in response to implicit or explicit user action, such as pointing, gazing and the like.

Figure 2B:
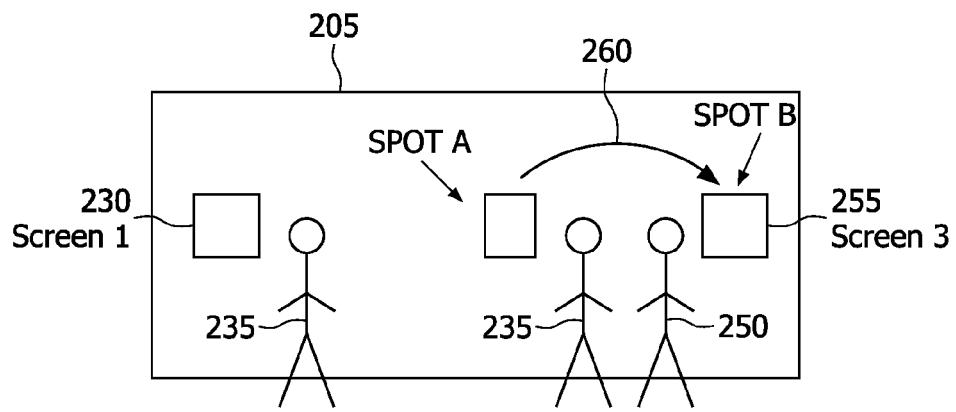

If another user 245 arrives, the new user gets his or her own private screen 235 activated on the shop window 205 positioned explicitly, implicitly or automatically such that both users do not disturb each other. Forcing two users to stay away from each other may be done even more explicitly. Suppose there are already two users interacting with the shop window and a third user 250 arrives, as shown in FIG. 2B, and initially stands near or behind one of the users 235. In this case, the system 200 detects that the third user 250 has arrived later than the second user 235 and will assume or conclude that these two users 235, 250 do not form a group, i.e. are not shopping together.

As the two users 235, 250 are not related and do not form a group, the shop window system 200 will display an arrow 260 pointing to the third private screen 255, shown in FIG. 2B, appearing at spot B inviting the third user to move to spot B which is chosen to minimize interference with the private screen 235 (located at spot A) of the previously present and detected user 235. As described, the distance between spots A and B are chosen to be larger than a predetermined distance (if there is room on the shop window display), by positioning the spots A, B at different sides of the two users 235, 255. The invitation to move, such as via the arrow 260 or via progressively moving the third private screen 255 further away from the other screen 235 to spot B for example, makes clear to the new user 250 where he should stand to have his own information screen 255. The movement of the screen may be in response to the movement of the associated user, for example.

Figure 2C:
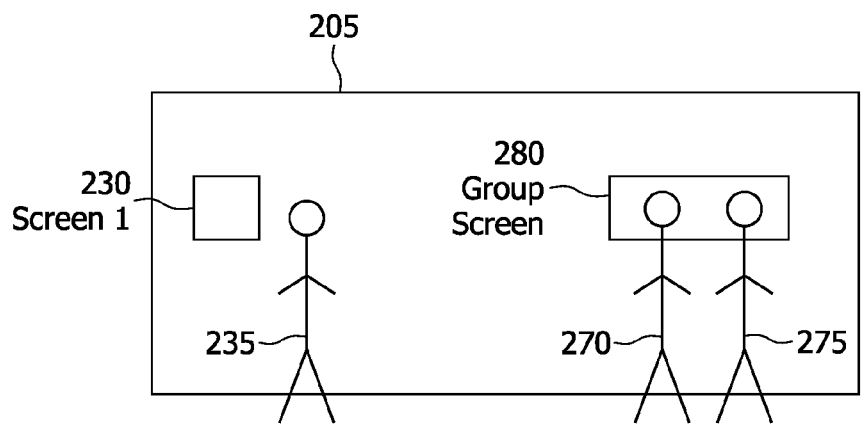

Alternatively, as shown in FIG. 2C, if two users 270, 275 arrive at the shop window 205 simultaneously and stay relatively close to each other and/or interact with each other, such as turn their heads to each other and talk for example, based on detecting certain act(s) including turning of the head(s), lip movement, and/or simultaneous arrival, the shop system 200 classifies these users 270, 275 as a group. In this case, the system 200 activates a group information screen 280 that may be larger in size then a screen for individual users, such as the private screens 230, 235, 255 shown in FIG. 2B. The position of the group screen 280 may be defined relative to the geometric center of gravity calculated for the group. The position of the group screen 280 is defined to allow at least two users 270, 275 to simultaneously see the products showcased in the window 205 and view the group display 280.

Since the shop window space is limited, the number of possible individual screens opened simultaneously will be a finite number. A maximum number of private screens per width may be empirically defined, and as soon as there are more individual users detected than the maximum, then the private screens may be merged with each other creating clusters or group screens. After reaching a predetermined threshold related to the number of displayed screens or the number of users, all the screens may merge into one single screen for the entire audience. Of course, the system administration may program or configure the processor to display any content, such as advertisement, promotional or any other information, on the entire show window or portion(s) thereof as desired, at any time such as periodically or randomly, such as promoting a two hour sale at certain times, or slashed prices on certain product, for example.

Returning to FIG. 3, if no new user(s) is detected in block 310, then the process returns to block 310 and when a new user(s) is detected, then in block 320 it is determined whether one or a group of users are detected. In the case of detecting or determining that one new user is near the shop window, then the process continues to block 330 where a private screen is displayed having an appropriate size, such as projected on the shop window. If a group of users is detected in block 320, then the process continues to block 340 where group screen is displayed having an appropriate size, such as larger than the size of the private screen. The size of the group screen may be related or proportional to the size of the group so that, for example, the larger the detected group then the larger the size of the group screen, and vice verse.

From block 330 and 340, the process continues to block 350 where it is determined or detected whether there are other user(s) or group(s) of users at the shop window. If none are detected, then in block 360 the display position relative to the new user or new group is calculated and a screen is provided for the new user, such as projected on the shop window.

If in block 350 it is determined that there are other user(s) or group(s) near the shop window, then in block 370, the new display or screen position relative to other screen(s) of other user(s) or group(s) is calculated, taking also into account the position of the new user or new group of users. In block 380 it is determined whether the new screen still fits between other active screens provided or displayed on the shop window. If the new screen still fits, then in block 390 the new screen is activated and provided on the shop window where. Next, the process returns to block 310 and the proximity of the shop window is monitored to detect new users or groups, as well as to monitor actions of existing users or groups. Otherwise, the process continues to block 395 where the new screen is merged with the closest active screen, for example, and then the process returns to block 310.

The shop interactive system 200, including the processor 120 (FIG. 1) may be configured to allow the users to adjust the size and/or position of their associated private screen in accordance with their individual preferences. For example, out of privacy concerns, some users may prefer to have the screen directly in front of them, instead of the side, and/or in a relatively small size, so that the information on the display is not visible to others. Customizing the screen and/or content may be based on individual preferences related to the look and feel of the screen, including size, shape, location of the screen, as well as preferences related to content, such as choosing or accessing desirable information, such as from links, images, texts or lists displayed on the screen.

Figure 4A:
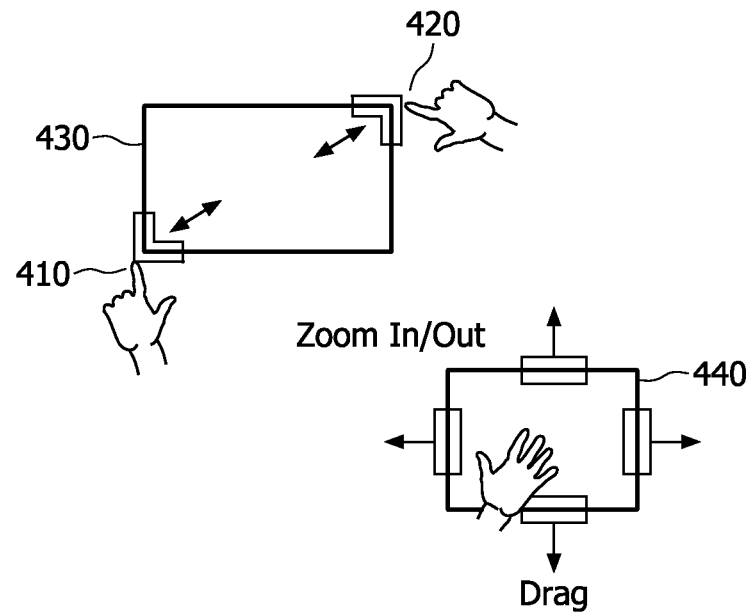
FIGS. 4A-4B show manual adjustments such as changing size and location as well as merging of information screen according to a further illustrative embodiment of the present invention.

Adjusting the size and position of a screen may be performed with a hand gesture, for example. As shown in FIG. 4A, for example, to adjust the screen size, the user may touch two opposite corners 410, 420 of an information screen 430 and move them either towards each other to decrease the screen size, or in opposite directions to increase the size of the screen 430. For adjusting the screen position, a user may first touch the screen with his whole hand or a portion thereof such as the palm, one, two or more fingers, for example, to activate a "drag" mode to drag or move the screen 440 and then shift it to a desired location on the shop window, using one finger for example.

Figure 4B:
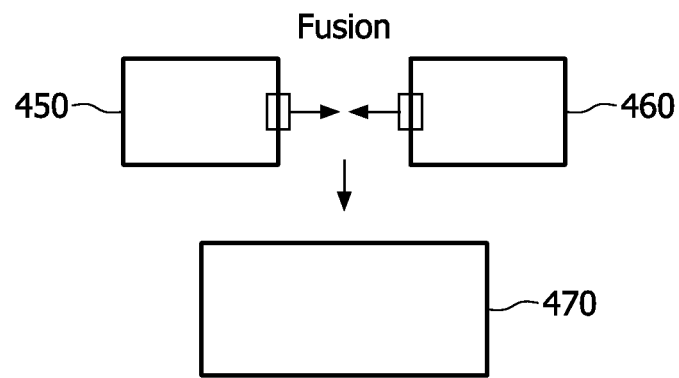

As shown in FIG. 4B, two individual screens 450, 460 may be merged by moving them towards each other. The merging of two or more private screens into a group screen may be performed automatically or manually. For example, as soon as the two screens are closer to each other then a predetermined distance, such as when a new screen is displayed in an already crowded shop window, then the two screens would merge into one big screen 470.

Alternatively or additionally, private screens may merge into a group screen(s) in response to detecting the individual users associated with the private screens move toward each other closer than a predetermined distance. Further, the private screens may merge in response to input from one of the users, such as activating a merge screen button displayed on at least one of the private screens, such as by touching a soft button displayed on the private screen.

Of course, similar to merging, splitting of a group screen into two or more private and/or group screens may also be effectuated automatically or manually, such as in response to implicit or explicit user action. Thus, user(s) in one group walking away from each other may cause the group screen to split into private screen(s) that would float on large display panel, or the shop window, following the individual user(s) that separated from the group. Further, at least one of the users in a group may activate a split screen button on the group screen to split from it into a private screen(s) to follow the user(s) separating from the group. Initially, the split private screen may be a duplicate or copy of the group screen, where the split private screen may be smaller than the group screen, for example.

Thus, for example, if one of the group members presses the split screen button, the group screen will copy itself and form a (e.g., smaller-sized) private screen (provided there is enough space). The remaining member(s) of the group can then continue browsing with the first (e.g., the group) screen, whereas the other user(s) may use the second screen (e.g., a split new private or new group screen).

The group screen itself may also shrink in size when split to form a smaller sized group screen and even smaller private screen(s) having sizes related to the number of associated users. Thus, in the case where a group has two users who separate, then the group screen is split into two smaller equal sized private screens (which may be half the size of the group screen or any other size). Of course, splitting of the group screen is performed so long as there is room on the shop window. As more private screens are displayed, their sizes may decrease up to a predetermined threshold, after which splitting screens or adding new screens, as well as further screen size reductions, may be suspended until the lack of display area on the shop window is alleviated, such as when users leave, cancel their private screens, or merge into groups, for example.

As the user(s) separates from the group, the content of the split private screen may also change in accordance with actions of the user associated with the private screen, such as pointing, gazing, activating soft buttons, etc.

Of course, before effectuating a merge or split operation, the user(s) may be first asked and suggestions provided whether to merge or split. Further, the user(s) may cancel a suggested merging or splitting action. For example, a dialog/pop-up screen may be provided in the private (or group) screen that asks whether it is desired to merge with (or split from) a neighboring user or group.

The displayed information on the screen(s) provided on the shop window may be any desired information including information related to products showcased behind the shop window and/or animation. For example, the shop owner or the manager/administrator of the interactive shop window system may decide that simple semantically meaningless animation is advantageous, such as providing entertainment to the shoppers to look at, or even to play with and have fun. Thus, 'information' is not to be understood in a limited way and may include any desired, selectable, programmable content, data, video, audio, and the like, including providing any environment, effects, images and/or sensations such as a fun environment including random images or effects such as a lava-lamp-like effects, attractive screen savers etc. In addition, the information may be related to any desired item or phenomenon, such as the weather, the season, special events, holiday effects etc. For example, if a local sport team wins a game, then the local team colors, images or animation of the game and/or players may be displayed; if the temperature is cold, then still or video images of a fireplace may be displayed, and the like.

Additionally or alternatively, the information may be related to product(s) of interest to the user as determined by the camera system that may include gaze detectors. The displayed information may include product specification, slide show, video clips related to the detected relevant products, for example. Thus, gaze detection may be used to determine the direction and thus products being looked at or pointed to, and users who are looking at the same or similar products may be grouped together, particularly when it is detected that the users are interaction with each other, such as talking to each other or turning there heads towards each other, for example. An interaction system for detecting gaze is described in European Patent Application Serial Number EP06118029.5, filed Jul. 28, 2006 entitled "Gaze Interaction for Information Display of Gazed Items" which is incorporated herein by reference in its entirety.

Other gaze detection and eye tracking systems may be used, such as those referred to as faceLAB™, for example, which are available from Seeing Machines of Australia. Further eye tracking systems that determine the user's line of gaze are described in U.S. Patent Application Publication No. 2004/0196433 to Durnell, entitled "Eye Tracking Systems" which is incorporated herein by reference in its entirety.

Further, user control and input may be provided by pointing or touching the touch sensitive shop window, such as at locations where screen are activated and information displayed including soft keys or buttons displayed on the individual screens and/or the shop window. Touch screens are described in UK Patent Application Number GB 2 367 991, to Porter et al., published on Jul. 17, 2002, entitled "Touch Sensitive Display Screen" which is incorporated herein by reference in its entirety. Other input/output devices 160 shown in FIG. 1 may also be used such as a mouse, track ball, keyboard which may include soft keys displayed on any touch screen and the like, such a mobile device like a personal digital assistant (PDA) or mobile phone that communicates with the show window system, e.g., wirelessly using Bluetooth protocol for example.

It should be understood that the interaction systems and methods are applicable in many situations, such as in museums, exhibitions and in general for applications where a combination of physical products and an electronic display is used.

Of course, as it would be apparent to one skilled in the art of communication in view of the present description, various elements may be included in the system components for communication, such as transmitters, receivers, or transceivers, antennas, modulators, demodulators, converters, duplexers, filters, multiplexers etc. The communication or links among the various system components may be by any means, such as wired or wireless for example. The system elements may be separate or integrated together, such as with the processor.

As is well-known, the processor 120 executes instruction stored in the memory 140, for example, which may also store other data, such as predetermined or programmable settings related to system interaction, thresholds, setting for the screens projected on the shop window.

The information displayed on the display device may include products related to the products look-at or determined to be of interest, or any other information such as advertisement, promotional material and products as determined by third party or different sources, such as the shop owner, system administrator, advertisers etc. Any information source may be used, whether stored locally or remotely, and/or accessible, pushed and/or pulled through a network, such as the Internet, for example, via the product manufacturer's web site or the like.

It should be understood that the various component of the interaction system may be operationally coupled to each other by any type of link, including wired or wireless link(s), for example. Various modifications may also be provided as recognized by those skilled in the art in view of the description herein. The memory may be any type of device for storing application data as well as other data. The application data and other data are received by the controller or processor for configuring it to perform operation acts in accordance with the present systems and methods.

The operation acts of the present methods are particularly suited to be carried out by a computer software program, such computer software program preferably containing modules corresponding to the individual steps or acts of the methods. Such software can of course be embodied in a computer-readable medium, such as an integrated chip, a peripheral device or memory, such as the memory or other memory coupled to the processor of the controller or light module.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory 120.

Additional memories may also be used. The computer-readable medium, the memory 140, and/or any other memories may be long-term, short-term, or a combination of long-and-short term memories. These memories configure the processor/controller 120 to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory, for instance, because the processor may retrieve the information from the network.

The processor 120 and the memory 140 may be any type of processor/controller and memory, such as those described in U.S. 2003/0057887, which is incorporated herein by reference in its entirety. The processor may be capable of performing operations in response to detecting user's gazes, and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems.

Of course, it is to be appreciated that any one of the above embodiments or processes may be combined with one or with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item(s) or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. An interaction system for displaying information to users via a panel, the system comprising:
   a detector configured to detect a position of a first user in proximity of the panel; and
   a processor configured:
      (i) to activate a first portion of the panel to display to said first user a first image on a first private screen containing the information, said portion being substantially near said position;
      (ii) to move said image with said first private screen along said panel based at least in part on a movement of said first user and maintain proximity of said first private screen with said first user;
   wherein said processor is further configured to activate a second portion of the panel to display a second image on a second private screen containing the information for a second user at a location that reduces interference with said first user concurrently with said first image and move said second image with said second private screen along the panel away from said first user.

2. The interaction system of claim 1, wherein said processor is further configured to invite said second user to stay away from said first user by displaying an arrow pointing to said second image.

3. The interaction system of claim 1, wherein said processor is further configured:

(i) to classify said first user and said second user as a group, and (ii) to activate a third portion of the panel larger than said first portion to display to said group a third image on a third private screen containing the information.

4. The interaction system of claim 1, wherein said information relates to one or more products located behind said panel and wherein said first portion is disposed such that said first image and said one or more products are viewable simultaneously by said first user.

5. The interaction system of claim 1, wherein said processor is further configured to enable said first user to adjust at least one parameter associated with said first portion of the panel, wherein said parameter comprises a location of said first portion or a size of said first portion, and merging of said display with a further display associated with a further user.

6. An interaction method for displaying information to users via a panel, the method comprising the acts of:

detecting a position of a first user in proximity of the panel;

activating a first portion of the panel as a movable first private screen to display to said first user a first image containing the information, said portion being substantially near said position;

moving said image with said first private screen along said panel based at least in part on a movement of said first user; and activating a second portion of the panel as a second movable private screen to display a second image containing the information for a second user at a location that reduces interference with said first user concurrently with said first image while maintaining proximity of each of said first and second private screens to the associated user.

7. The interaction method of claim 6, further comprising the act of inviting said second user to stay away from said first user by at least one of:

moving said second image along the panel away from said first user, and displaying an arrow pointing to said second image.

8. The interaction method of claim 6, further comprising the act of classifying said first user and a further said second user as a group, and; activating a third portion forming a third private screen of the panel larger than said first portion to display to said group a third image containing the information.

9. The interaction method of claim 6, wherein the information relates to one or more products located behind said panel, the method further comprising the act of selecting a location of said first portion such that said first image and said one or more products are viewable simultaneously by said first user.

10. The interaction method of claim 6, further comprising the act of enabling said first user to adjust at least one parameter associated with said first portion of the panel, wherein said parameter comprises a location of said first portion, or a size of said first portion.

11. An interaction method for displaying information to users through individual movable private screens, comprising:

detecting a position of a first user in proximity of the panel;

activating a first portion of the panel as a first movable private screen to display to said first user a first image containing the information, said portion being substantially near said position;

moving said image with said first movable private screen along said panel based at least in part on a movement of said first user;

activating a second portion of the panel as a second movable private screen to display a second image containing the information for a second user at a location that reduces interference with said first user concurrently with said first image;

maintaining proximity of each of said first and second private screens to the associated user.

* * * * *